United States Patent [19]
Mettner et al.

[11] Patent Number: 5,647,574
[45] Date of Patent: Jul. 15, 1997

[54] MULTI-LAYER MICROVALVE HAVING INTEGRAL CLOSURE, MEMBRANE AND PRESSURE COMPENSATING SURFACE FORMING A MIDDLE LAYER

[75] Inventors: Michael Mettner, Ludwigsburg; Armin Schuelke, Schwieberdingen; Christian Doering, Stuttgart; Thomas Schittny, Steinheim-Murr, all of Germany

[73] Assignee: Robert Bosch GmbH, Stuttgart, Germany

[21] Appl. No.: 360,652

[22] PCT Filed: Jun. 8, 1993

[86] PCT No.: PCT/DE93/00493

§ 371 Date: Dec. 16, 1994

§ 102(e) Date: Dec. 16, 1994

[87] PCT Pub. No.: WO94/00696

PCT Pub. Date: Jan. 6, 1994

[30] Foreign Application Priority Data

Jun. 26, 1992 [DE] Germany ............... 42 21 089.5

[51] Int. Cl.⁶ ......................................... F16K 31/02
[52] U.S. Cl. ........................ 251/129.06; 251/129.01
[58] Field of Search .................... 251/129.01, 129.05, 251/129.06

[56] References Cited

U.S. PATENT DOCUMENTS

| | | | |
|---|---|---|---|
| 4,643,223 | 2/1987 | Abe et al. | 251/129.06 |
| 5,029,805 | 7/1991 | Albarda et al. | 251/129.06 |
| 5,161,774 | 11/1992 | Engelsdorf et al. | 251/129.06 |
| 5,238,223 | 8/1993 | Mettner et al. | 251/129.06 |
| 5,340,081 | 8/1994 | Wright | 251/129.06 |
| 5,581,624 | 12/1996 | O'Connor | 251/129.06 |

FOREIGN PATENT DOCUMENTS 1355823 11/1987 U.S.S.R. ............... 251/129.06

*Primary Examiner*—Hoang Nguyen
*Attorney, Agent, or Firm*—Michael J. Striker

[57] ABSTRACT

The microvalve according to the invention is composed in a layered manner of at least one bottom part (11), one middle part (12) and one top part (13). The sealing ring (31) (closure member), the valve plate (29) (pressure-compensating surface) and the membrane (26) are integrated in the middle part (12), this integral component being manufactured by a plastic moulding process. The actuation of the valve takes place using an electrical operating apparatus, for example by an electrostatic drive, an electromagnetic or a piezoelectric drive. In particular in the case of the electrostatic drive, two electrodes (17, 22) are applied in a layered manner to the middle part (12) or the bottom part (11). The bottom part, middle part and top part are joined together and connected, for example bonded or welded, permanently to one another.

14 Claims, 7 Drawing Sheets

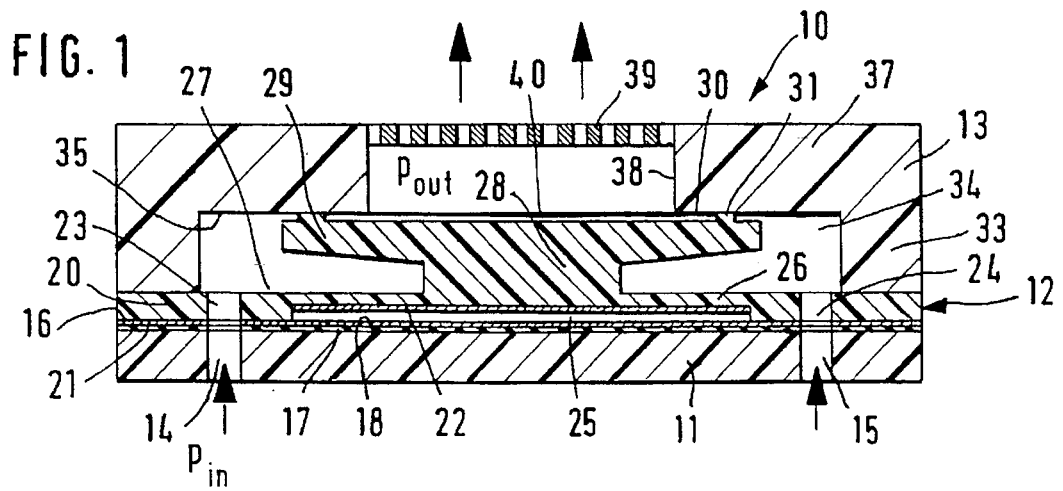
FIG. 1
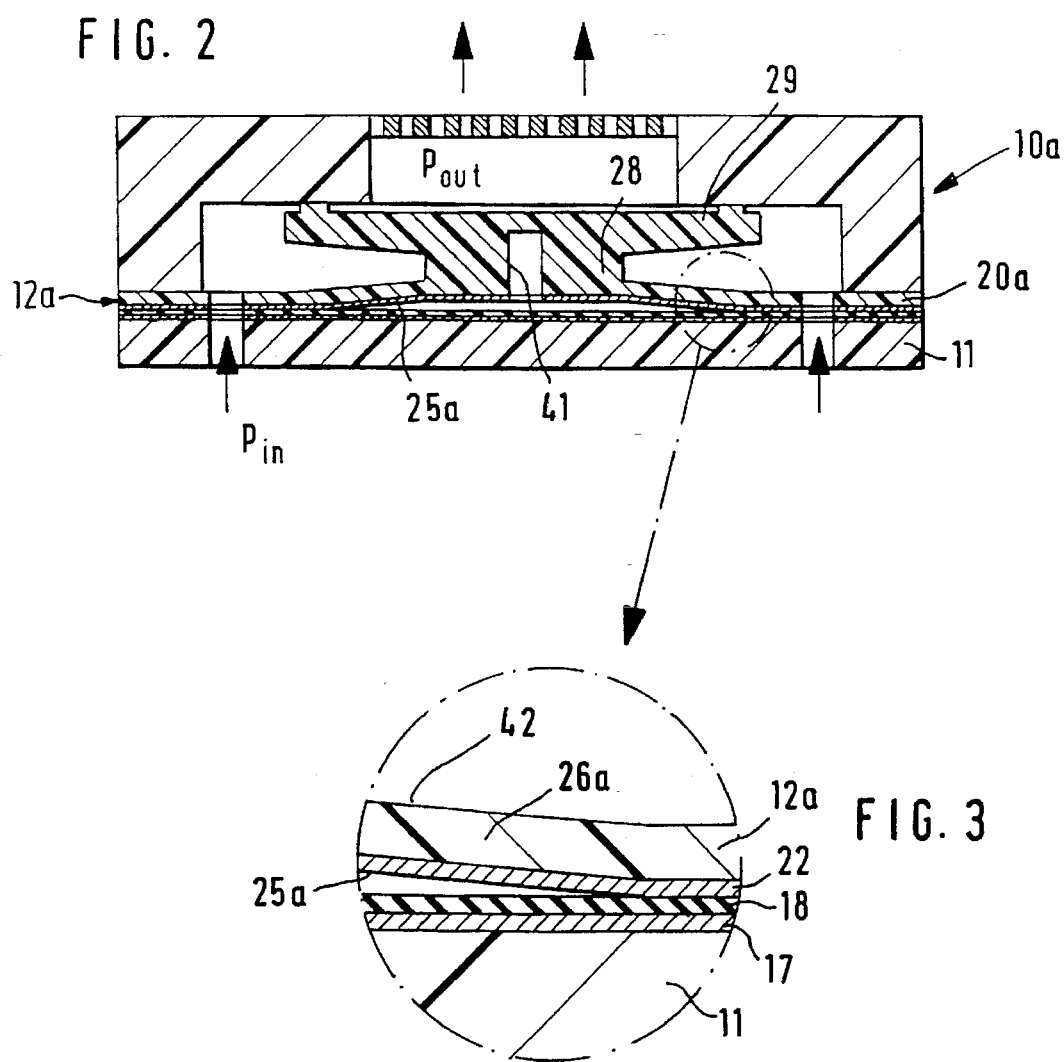
FIG. 2
FIG. 3

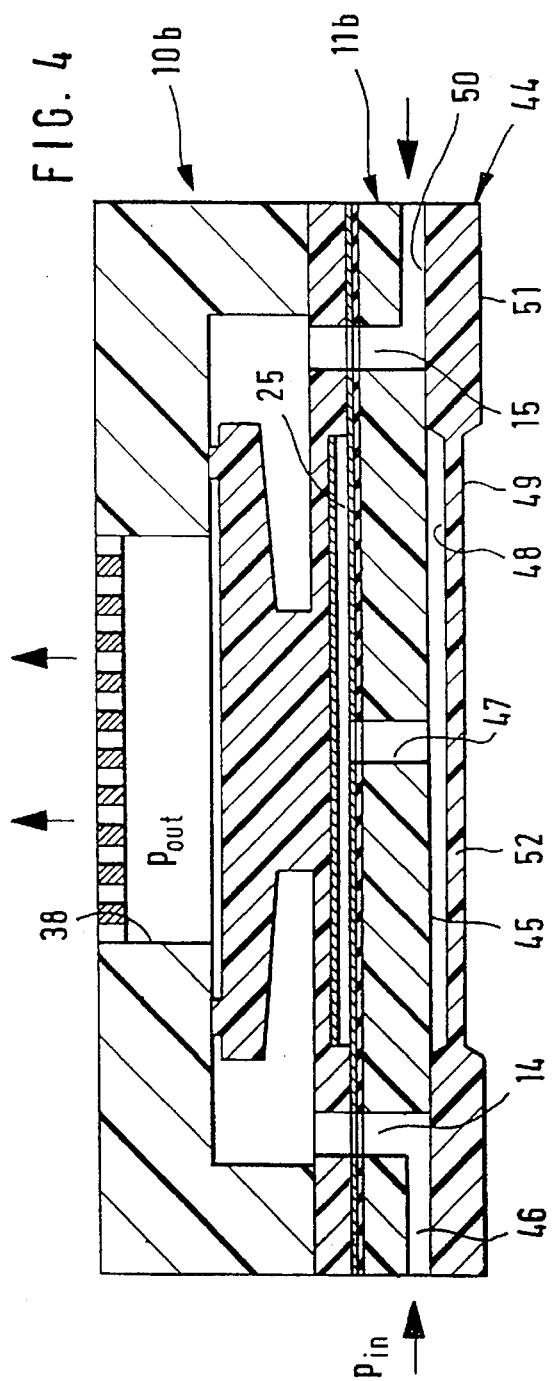
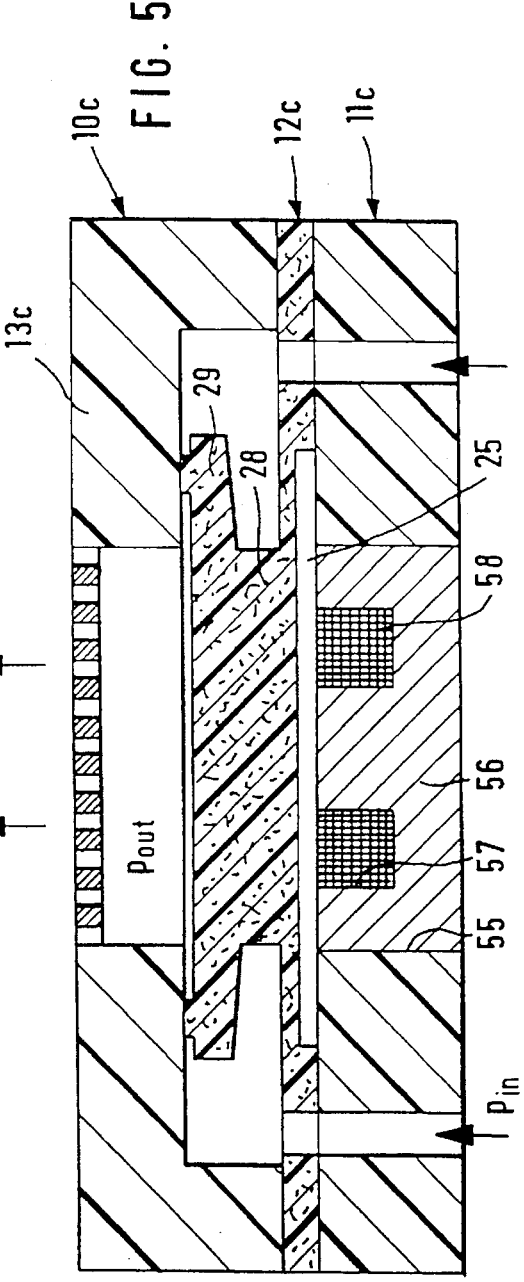

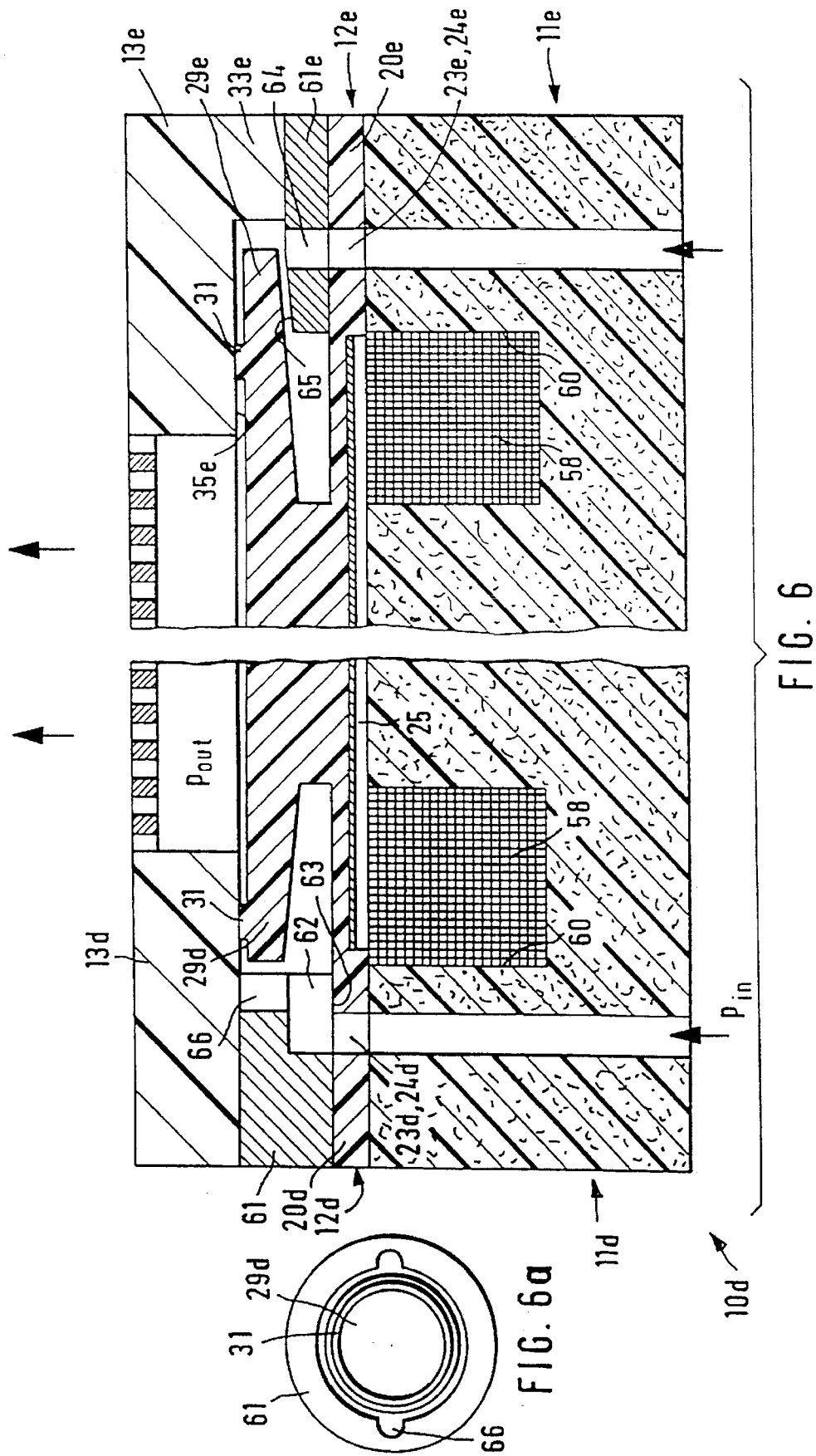

5,647,574

MULTI-LAYER MICROVALVE HAVING INTEGRAL CLOSURE, MEMBRANE AND PRESSURE COMPENSATING SURFACE FORMING A MIDDLE LAYER

BACKGROUND OF THE INVENTION

Prior Art

The invention starts from a microvalve of layers arranged one above the other and connected to one another and relates furthermore to a valve arrangement having at least two microvalves connected in parallel.

Microvalves of this type are usually composed of semiconductor layers which are bonded to form the permanent connection. The individual semiconductor layers are brought into the shape and structure necessary for the function by complex etching methods. A microvalve of this type is described, for example, in WO 90/15933. Such microvalves are relatively expensive due to the expensive layer material or the complex manufacturing processes. Owing to the very complex production technique, the valves have to be produced in very large numbers in order to achieve a sufficient cost-effectiveness. Adaptations or differentiations of these microvalves during manufacture can only be carried out at considerable expense.

SUMMARY OF THE INVENTION

The microvalve according to the invention is characterized in that the closure member, the membrane and the pressure-compensating surface are formed in an integral plastic component which is a middle layer of the microvalve.

The microvalve according to the invention therefore is distinguished by a simple construction and can thus be manufactured cost-effectively. The construction is selected such that the valve can be composed with a very small number of individual elements so that the connection methods are reduced to a minimum and the errors and complexities associated with these connection methods are thus likewise reduced.

In the manufacture of the valve, the middle part, in particular, is manufactured by a plastic moulding process—in particular injection moulding or embossing—and thus by a moulding or structuring process which has a high degree of precision and reproducibility with low expense. Modifications and adaptations are possible with relatively little expense due to modular construction of one or more valves.

In this manufacturing method, differentiated requirements in respect of the material or different material components, compositions or types of layering can additionally be fulfilled.

The valve arrangement according to the embodiment in which the two electrodes of the electra static device are designed at least as part of the outer surface of a pyramid, has the advantage that adaptations of the flow volume can easily be undertaken due to the modular construction and the parallel connection of a plurality of microvalves. The valve arrangement can be adapted in a simple manner to different volume requirements. By means of different fitting in the type and number of the microvalve units, a diversity of variants can additionally be achieved with little diversity of components in a simple and cost-effective manner in terms of production.

Further advantages and advantageous further developments result from the description and the subclaims.

BRIEF DESCRIPTION OF THE DRAWINGS

The invention is explained in greater detail with reference to the following description and drawing. The latter shows, in FIG. 1, a section through a microvalve according to the invention in a simplified illustration, in FIG. 2, a section through a second exemplary embodiment of the microvalve, in FIG. 3, a detail of this second exemplary embodiment, in FIGS. 4 and 5, a third and fourth exemplary embodiment, in FIG. 6, in the left half of the picture a first modification and in the right half of the picture a second modification of the microvalve according to FIG. 5, in FIG. 6a, a plan view of the opened first modification, in FIG. 7, in the left half and right half of the picture in each case different modifications of the microvalve according to FIG. 1, in FIGS. 8 and 9, in their left and right halves of the picture in each case further modifications of the micro-valve according to FIG. 1, in FIG. 10, a cutaway, perspective illustration of a microvalve arrangement with microvalves connected in parallel.

DESCRIPTION OF THE PREFERRED EMBODIMENTS

Figure 7:
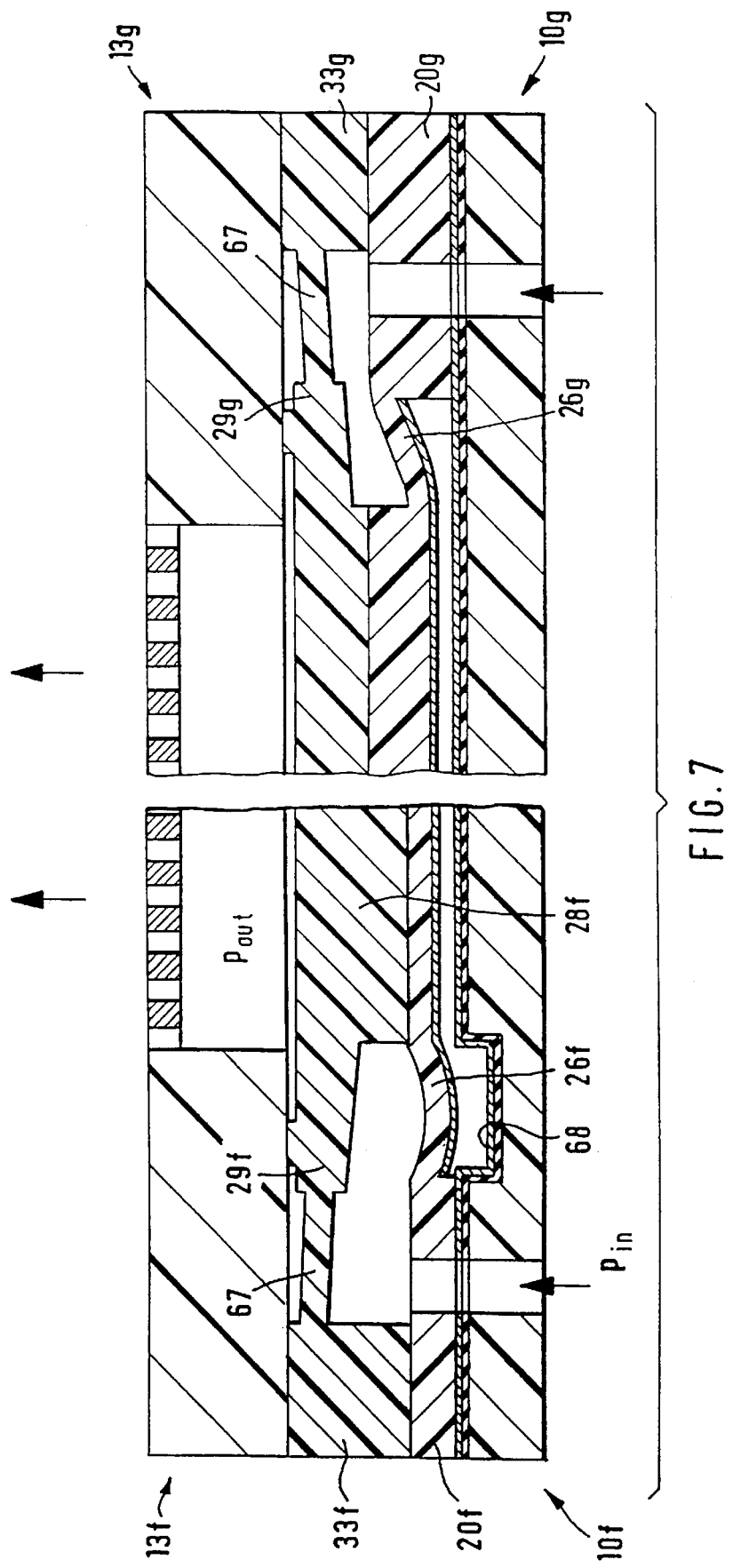

The microvalve 10 illustrated in FIG. 1 is joined together from three components placed one on the other in a layered manner, a bottom part 11, a middle part 12 and a top part 13. The bottom part 11 consists of a plastic material or of aluminium and is designed as a cylindrical disc. In the axial direction, it is penetrated by two continuous channels 14, 15 which serve to supply pressure medium. However, it is also possible to allow the supply of pressure medium to take place via a single or via a plurality of channels. An electrically conducting layer 17 is applied to the upper side 16 of the bottom part 11, which layer 17, in turn, is covered by an insulating layer 18. If the bottom part 11 is produced from an electrically conducting material, an additional insulating layer—not illustrated here—is arranged between the electrically conducting layer 17 and the bottom part.

The middle part 12 has a cylindrical base plate 20 whose dimensions correspond to those of the bottom part 11 and which is placed on the latter. Applied to the underside 21 of the base plate 20 is an electrically conducting layer 22 which, in the assembled state of the microvalve 10, is separated from the electrically conducting layer 17 of the bottom part 11 by the insulating layer 18. The bottom part 11 and middle part 12 are firmly and permanently connected to one another by bonding or welding. In this case, the electrically conducting layers 17 and 22 are connected in a manner not illustrated to feed lines which can be connected to a voltage source via switching devices.

The base plate 20 of the middle part 12 likewise has two channels 23, 24 which are flush with the channels 14, 15 of the bottom part 11. In a modified design of the bottom part 11, these channels are adapted appropriately. Recessed into the underside 21 of the middle part 12 is a flat, cylindrical depression 25 whose diameter is smaller than the distance between the channels 23, 24. The depression 25 is likewise covered by the electrically conducting layer 22 and is dimensioned in such a way that the base plate 20 is designed in this region as a membrane 26. However, the depression 25 can also have a different cross-sectional shape from that of a circle, for example that of a square or of a hexagon, and it is advantageously integrally axisymmetrical. The top part 13, the base plate 20 and the bottom part 11, too, can not only be of cylindrical, but also of correspondingly axisymmetrical design.

Formed on the upper side 27 of the base plate 20 is a cylindrical (axisymmetrical) projection 28 whose dimensions are smaller than those of the depression 25. This projection 28 widens on the side opposite the base plate 20 into a flat, frustoconical valve plate 29. The latter has, on its free end face 30, an annular sealing ring 31 which serves as a closure member of the microvalve.

The annular edge 33 of the cup-shaped top part 13 is placed on the upper side 27 of the base plate 20. The interior 34 of the top part 13 is dimensioned such that its diameter is greater than the distance between the channels 23, 24. The height of the interior 34 is dimensioned such that the sealing ring 31 bears against the inner side 35 of the base part 37 of the top part 13. The base part 37 is penetrated by an outlet channel 38 which opens out into the interior 34 within the region 40 bounded by the sealing ring 31. This region 40, bounded by the sealing ring 31, of the top part 13 serves as a valve seat which interacts with the sealing ring 31 serving as a closure member. A nozzle plate 39 is fitted into the outlet channel 38 to influence the flow characteristics of the pressure medium. However, this nozzle plate can also be integrated.

The microvalve 10 described is suitable for many applications, for example as a fuel injection valve in internal combustion engines of motor vehicles. The interior 34 communicates with a source of pressure medium—for example a fuel line—via the channels 14 and 15 in the bottom part 11 and the channels 23, 24 in the middle part 12. In the switching state illustrated, the interior 34 is closed on one side, i.e. the sealing ring 31 of the valve plate 29 serving as a closure member bears against the inner side 35 of the top part 13 or of the base part 37 and closes the outlet channel 38 (valve seat). The prestress or the force with which the valve plate 29 or the sealing ring 31 is pressed against the inner side 35 of the top part 13 is dependent on the elastic properties of the material of the middle part or on the design of the membrane 26 and on the ratio of the height of the interior to the corresponding dimensions of the projection 28 and the valve plate 29 together with the sealing ring 31. In this case, the membrane 26 acts, due to the design and arrangement of the projection 28, as an annular membrane and serves as a spring means which, in the neutral switching state of the microvalve, presses the closure member (sealing ring 31) against the valve seat (inner side 35 around the outlet channel 38).

If the two electrically conducting layers 17, 22 are connected to the voltage source via the feed lines (not illustrated), the switching devices and the corresponding connections in such a way that the two layers have opposite polarity, the latter act as a capacitor and, in the region of the depression 25, as an actuating means for the microvalve. Owing to the forces of attraction due to the different poling of the two layers (electrodes of an electrostatic drive), the membrane 26 curves down towards the bottom part 11 in the region of the depression 25. By means of the connection of the valve plate 29 via the projection 28 to the membrane 26, the sealing ring 31 lifts off from the inner side 35 of the top part 13, thus producing a connection from the interior 34 to the outlet channel 38. In the case of excessive deflection of the membrane 26, the insulating layer 18 prevents contact of the two electrically conducting layers 17, 22 (electrodes of the electrostatic drive) and thus prevents a short circuit.

An even lifting-off from the inner side 35 or an even bearing against said inner side is guaranteed due to the rotationally symmetrical or axisymmetrical design of the depression 25, the membrane 26, the projection 28 and the valve plate 29. When the outlet channel 38 is closed, the pressure in the interior 34 acts, on the one hand, downwards onto the membrane 26 and, at the same time, onto the free annular surface of the valve plate 29. The two annular surfaces, i.e. the annular surface of the membrane 26 and the annular surface acted upon by pressure on one side (resulting annular surface of the valve plate 29) are matched to one another in their dimensions in such a way that the movable construction element (valve plate 29, projection 28, membrane 26) is statically pressure-compensated. The upwardly directed forces and moments due to the pressure on the resulting annular surface on the valve plate 29 and those directed downwards onto the corresponding annular surface of the membrane 26 are equal in size. In this case, the effective annular surface on the valve plate 29 acts as a pressure-compensating surface relative to the membrane 26. In this case, it is assumed that the pressures below and above the movable construction element are essentially equal in size, i.e. the pressure in the depression 25 should correspond essentially to the pressure in the outlet channel 38 when the valve member is closed. However, there does not inevitably have to be the same medium in the depression 25 as in the outlet channel 38. Owing to the pressure-compensated construction of the microvalve 10, the restoring force due to the membrane 26 can be very small. Owing to the pressure-compensated construction, it is furthermore possible for very high pressures to be controlled and for a relatively weak drive to be usable as the electrical actuating means. The microvalve 10 is suitable for controlling great hydraulic or pneumatic capacities and allows a high degree of dynamics. An only partial pressure compensation can also be achieved by appropriate modification of the effective annular surface on the valve plate 29 (pressure-compensating surface) relative to the surface of the valve plate 29 subjected to outlet pressure in the region of the outlet channel 38. By this means, however, consideration of the dynamic flow forces is possible at the same time so that the switching characteristics of the microvalve 10 can be influenced.

In the microvalve 10 described here, the middle part 12 is manufactured by injection moulding from a plastic whose composition and structure are adapted to the application site and the pressure medium. It is also possible to produce the middle part 12 and/or top part 13 and bottom part 11 by embossing. The frustoconical design of the valve plate 29, in particular, facilitates the demoulding of the middle part 12 after injection moulding. After demoulding and any burring, the underside (including the depression 25 and membrane 26) is provided with an electrically conducting layer 22 and contact is made with it. Owing to the design described, the essential construction elements are integrated in the middle part 12 with narrowly tolerated dimensions. The height of the interior 34—as a further dimension essential to the function—is primarily responsible for a good bearing of the sealing ring 31 and the prestress of the membrane 26.

In two process steps, the bottom part 11, which can be produced by injection-moulding, embossing or stamping likewise from a plastic or from aluminium, is firstly provided with an electrically conducting coating on its upper side 16 and contact is made with it, and subsequently the said bottom part 11 is provided with the insulating layer. When aluminium is used, a further insulating layer must firstly be applied. The plastic for the bottom part 11 can be a different one from that of the middle part 12 since the elastic properties are not of primary importance. Instead, other properties, such as heat-resistance, strength, or the like, can be of primary importance. The bottom part 11 and middle part 12 are joined together in the correct position in a further operation and bonded or welded to one another. In addition to a suitable plastic, the use—as already mentioned—of a metal material (e.g. aluminium) which is adapted in terms of its thermal expansion is also possible. It is also possible to make the channels 14, 15 or 23, 24 by boring, laser-cutting or similar methods after this joining-together so that the assignment in the correct position is always guaranteed.

The top part 13 can be made up of a plastic which differs from that of the bottom part 11 or of the middle part 12 or from both. The top part 13 is manufactured by a corresponding moulding process from firm plastic, for example by embossing, or from a free-flowing plastic by injection-moulding. The top part 13 can also consist of a suitable metal or a (metal) alloy. After the moulding operation, the nozzle plate 39 is inserted into the outlet channel 38 and bonded or welded. In the case of injection-moulded or injection-embossed top parts, the nozzle plate can also be produced in one piece with said top parts. The top part 13 is placed on the middle part 12 and likewise bonded or welded. It is also possible to join and connect the bottom part 11, middle part 12 and top part 13 in a common operation. The top part 13 and/or the bottom part 11 can also already be adapted to the application site of the microvalve in the moulding process, for example by moulding on tube connections, attachment means or safeguards against rotation. In contrast to the electrostatic valve actuation described, the coating on the bottom part and middle part can also be replaced by a piezoelectric coating on the middle part so that the actuation of the valve takes place in a manner known per se by means of the change in shape due to the piezoelectric effect.

FIGS. 2 and 3 describe a second exemplary embodiment of a microvalve according to the invention, the same reference numerals being used for the same construction elements.

The microvalve 10a differs from that described above mainly due to the design of the depression and thus of the membrane, thus resulting in higher drive or actuation forces. The depression 25a in the base plate 20a of the middle part 12a has the shape of a flat truncated cone which widens towards the underside. Starting from this truncated cone is a central blind bore 41 which protrudes through the projection 28 right into the valve plate 29. The underside 21 of the base plate 20 and the depression 25a —as in the exemplary embodiment above—are provided with an electrically conducting layer 22. Correspondingly, the bottom part 11 is provided with an electrically conducting layer 17 and an insulating layer 18.

The base plate 20a is not designed as a flat disc as in the exemplary embodiment above, but has, in the region of the membrane 26a, an upward slope 42 which corresponds to the conical course of the depression 25a, thus guaranteeing an even membrane thickness.

In the electrostatic actuation of the microvalve 10a, the membrane 26a bears against the bottom part 11a starting from the outer circumference of the depression 25a towards the centre since the forces of attraction increase quadratically with the reciprocal value of the distance between the electrically conducting layers. In this case, the displaced (gas) volume can escape into the blind bore 41 in the case of a small pressure increase.

FIG. 4 illustrates a third exemplary embodiment of the microvalve in which a complete, static pressure compensation of the moved construction elements is possible at any outlet pressure. The microvalve 10b corresponds in its construction essentially to the microvalve 10 described in FIG. 1, a base part 44 being attached additionally to the bottom part 11b. On its underside 45, the bottom part 11b has radial channels or—as illustrated here—a circumferential annular groove 46 which extends from the channels 14, 15 up to the outer edge. By means of this annular groove 46, the channels 14, 15 can be acted upon by pressure medium from the outer circumference of the microvalve 10b. Arranged furthermore in the bottom part 11b is a central bore 47 which starts from the underside 45 and protrudes into the depression 25. The base part 44 is produced from plastic by a moulding process as a flat, cylindrical (axisymmetrical) disc and has two cylindrical (axisymmetrical) depressions 48, 49 in its upper side 50 and underside 51 respectively. The depressions 48, 49 form a second membrane 52 in the base part 44.

The base part 44 is attached either in a separate operation or together with other components (top part, middle part, bottom part) and is connected, for example bonded or welded, firmly and non-releasably to the bottom part 11b.

When the microvalve 10b is operated, the underside 51 of the base part 44 is acted upon by the outlet pressure ($P_{out}$) which also prevails in the outlet channel 38. The movable element (valve plate 29, projection 28, membrane 26) is thus always completely (statically) pressure-compensated independently of the magnitude of this outlet pressure.

FIG. 5 describes a fourth exemplary embodiment of the microvalve in which the actuating means or the drive is of electromagnetic design. This actuating means consists of a pot magnet which is integrated in the bottom part, is excited by a coil and has a low-retentivity core. The top part 13c and middle part 12c of the microvalve 10c are essentially constructed in the same manner as the corresponding components in the microvalve 10 described in FIG. 1. In contrast thereto, however, the electrically conducting layer is omitted in the middle part 12c. Instead, ferromagnetic particles are embedded in the plastic, which particles are introduced into the raw moulding compound during the preparation thereof.

The electrically conducting layer and the insulating layer are likewise omitted in the bottom part 11c. Instead, the bottom part has a through-bore 55 into which a core 56 of stacked electroplates which are known per se is firmly inserted. This core 56 has, on its end face facing the middle part 12c, an annular groove 57 into which a coil 58, known per se, is wound.

By appropriate current supply to the coil 58, the projection 28 and the valve plate 29 of the middle part 12c are attracted towards the coil 58 and act as magnet armatures. The depression 25 or the gap between the coil 58 and the base of the depression 25 acts as an operating air gap. In this case, the flow of the magnetic circuit is guided essentially through the projection 28.

It is also possible to restrict the embedding of ferromagnetic particles in the middle part 12c locally, said particles then only being embedded in the region of the magnetic flow.

In order to facilitate the winding of the coil 58, the core 56 can also consist of two concentric parts inserted one inside the other, an outer sleeve and an inner winding cylinder. Instead of the design of the core 56 of stacked electroplates, said core can also be moulded from a plastic which is mixed with ferromagnetic particles.

FIG. 6 shows in the left half and the right half of the picture in each case a modification of the microvalve described above, which modifications differ from the latter by a changed course of the magnetic flow. The two embodiments themselves differ in the design of the guide ring and of the corresponding shaping of the top part, the air gap between the guide ring and the valve plate being arranged either lying in the power flux (direction of movement of the valve plate) or orthogonally thereto. In both cases, the bottom part 11d or 11e has in its upper side an annular groove 60 whose outside diameter corresponds approximately to that of the depression 25. The coil 58 is wound into this annular groove 60. The bottom part 11d or 11e is mixed with ferromagnetic particles and is either—as illustrated—of integral design or—as described for the core 56—composed of two concentric parts. Placed on this bottom part 11d or 11e is the middle part 12d or 12e which corresponds in its design essentially to the middle part 12c described above.

In the case of the first modification of the microvalve—illustrated in the left half of the picture—a ferromagnetic guide ring 61 is placed on the base plate 20d of the middle part 12d, the outer dimensions of said guide ring corresponding to those of the base plate 20d and the inner dimensions thereof being slightly larger than the dimensions of the valve plate 29d or of the depression 25. FIG. 6a shows this guide ring in a plan view of an opened microvalve 10d. In the region of the channels 23d and 24d, this guide ring has, on its underside 63, a groove 62 starting from the inner circumference. Furthermore, it has, on its upper side, at least two bores or cut-outs 66 which are arranged in such a way that they guide the flow volume of the fluid past the sealing ring 31 when the valve is open. The gap between the guide ring 61 and the valve plate 29 can then be kept small for the effective guiding of the magnetic flow. The thickness of the guide ring 61 corresponds to the height of the edge 33 of the top part 13 in the exemplary embodiments described above, i.e. the thickness of the guide ring 61 is selected such that the sealing ring 31 of the valve plate 29d is pressed against the top part 13d with a defined pressing-on force. In this modification, the top part 13d is consequently designed as a flat disc (without a sleeve-shaped edge).

The middle part 12d, together with the base plate 20d, projection 28 and valve plate 29d, is preferably, like the guide ring 61, moulded from a plastic which is mixed with ferromagnetic particles.

The joining-together and connecting of the individual layer components (bottom part, middle part, guide ring, top part) can take place in individual process steps or in any combination in analogy to the embodiments described above.

In the microvalve 10d, the magnetic circuit runs through the depression 25 as an operating air gap, the projection 28, the valve plate 29d, the annular space between the valve plate 29d and the guide ring 61 (subsidiary air gap) and the base plate 20d, and is closed by means of the bottom part 11d. In this case, the subsidiary air gap lies orthogonally relative to the direction of movement of the valve plate 29d.

In the second modification (right half of the picture), the subsidiary air gap lies in the direction of force so that the attracting forces are intensified to a certain degree.

As in the embodiment above, the guide ring 61e is placed on the base plate 20e; its inner dimensions correspond approximately to the dimensions of the depression 25. However, its thickness is smaller than in the previous embodiment and is smaller than the distance between the base plate 20e and the valve plate 29e at the outer edge thereof. In the region of the channels 23e, 24e, the guide ring 61e has passages 64 which are flush with said channels. To improve the magnetic flow, the valve plate 29e is designed with a greater outer dimension so that it partially covers the guide ring 61e. The dimensions of the sealing ring 31 and those of the depression 25, however, remain unchanged or are adapted to one another in respect of the pressure compensation.

In the region of the covering of the valve plate 29e and the guide ring 61e, the latter has a conical recess 65 whose slant is adapted to the conical course of the valve plate 29e.

The top part 13e has a sleeve-shaped edge 33e which rests on the guide ring 61e, and whose height is selected such that the valve plate 29e or the sealing ring 31 bears against the inner side 35e of the top part 13e.

In this embodiment, too, the middle part 12e, the guide ring 61e and the bottom part 11e are ferromagnetic. The magnetic circuit runs in analogy to the exemplary embodiment described above, with the difference that here the annular gap between the guide ring 61e and the valve plate 29e (subsidiary air gap) is flowed through in the direction of movement of the valve plate 29e.

In order to prevent the negative consequences of possibly occurring creep of the membrane 26, the latter can alternatively be designed as a pure sealing membrane without spring effect. Alternatively or additionally, the design of the depression or of the membrane and that of the bottom part can be varied in the region of the depression. In this respect, two possible embodiments are illustrated in FIG. 7. Here, both embodiments are explained with reference to the electrostatic actuation principle, but this can readily be transferred to the piezoelectric or electromagnetic principle.

In order to restrict the action of the membrane 26f or 26g to a pure sealing function, additional spring elements 67 are provided both in the microvalve 10f—illustrated in the left half of the picture—and in the microvalve 10g—illustrated in the right half of the picture. These are designed as radially extending spring beams which are in each case firmly connected to the sleeve-shaped edge 33f, 33g on the one hand and to the outer edge of the valve plate 29f, 29g on the other hand.

The spring elements 67 are also moulded on during the moulding process of the sleeve-shaped edge 33f, 33g and of the valve plate 29f, 29g, and are produced simultaneously with these parts in one injection-moulding item. For this purpose, the middle part 12f, 12g is advantageously given the construction described in the following. The base plate 20f, 20g and the projection 28f, 28g are produced as one component on which the valve plate 29f, 29g with the spring elements 67 and the sleeve-shaped edge 33f, 33g are placed and bonded or welded. The top part 13f, 13g is then only a disc.

In this case, the edge 33f, 33g, together with the base plate 20f, 20g, forms the middle layer of the microvalve 10f, 10g.

An influence of creep of the membrane in the radial direction on a movement in the axial direction (opening and closing direction) can also be reduced by a corresponding design of the membrane, as is illustrated in FIG. 7. By corresponding shaping and/or expansion, the membrane 26f is given a curved cross-section or an approximately S-shaped cross-section (26g). Owing to these or other curves or bends of the membrane 26f, 26g, the effects of a change in shape of the membrane in the transverse direction (perpendicular to the direction of movement of the valve plate) on the pressing-on force or prestress are substantially reduced.

In the microvalve 10f, a circumferential annular groove 68 is additionally formed in the bottom part 10f in the region of the membrane 26f so that contacting or bearing of the membrane is avoided even at high pressure differences on its two sides.

Each of the measures illustrated here in FIG. 7 to reduce the effect of any membrane creep can be applied separately, with one or both of the other methods or designs to the microvalves according to FIG. 1, 4 to 6. In the microvalve 10a according to FIG. 2, the membrane 26a is advantageously adapted, for example by targeted inclusion of fibrous materials, metals or by using correspondingly creep-resistant plastics. In this valve, high actuating forces or large valve strokes can be brought about above all by the use of the electrostatic drive principle so that the controllable flow volume and/or the operating pressure can be increased.

Figure 8:
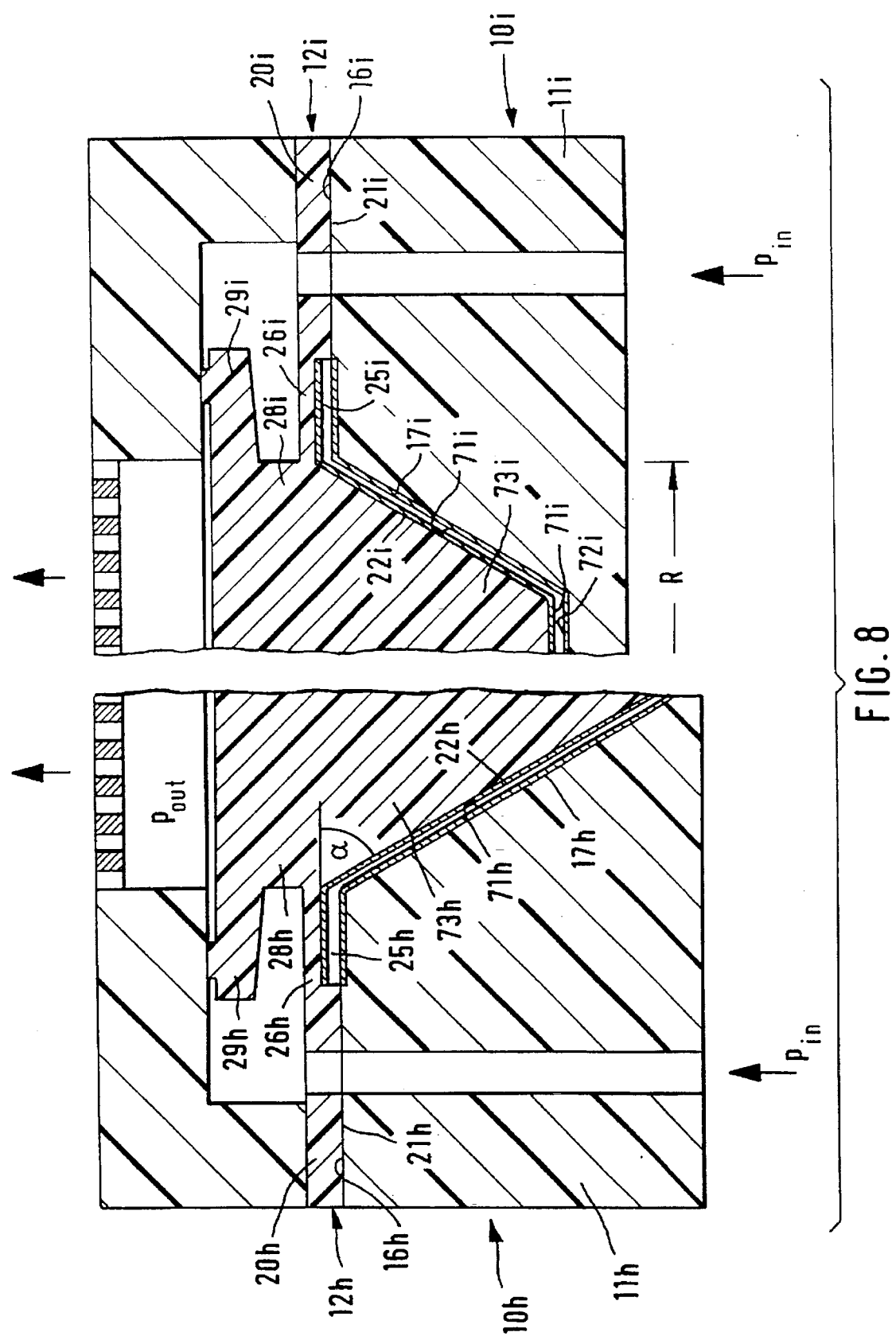
Figure 9:
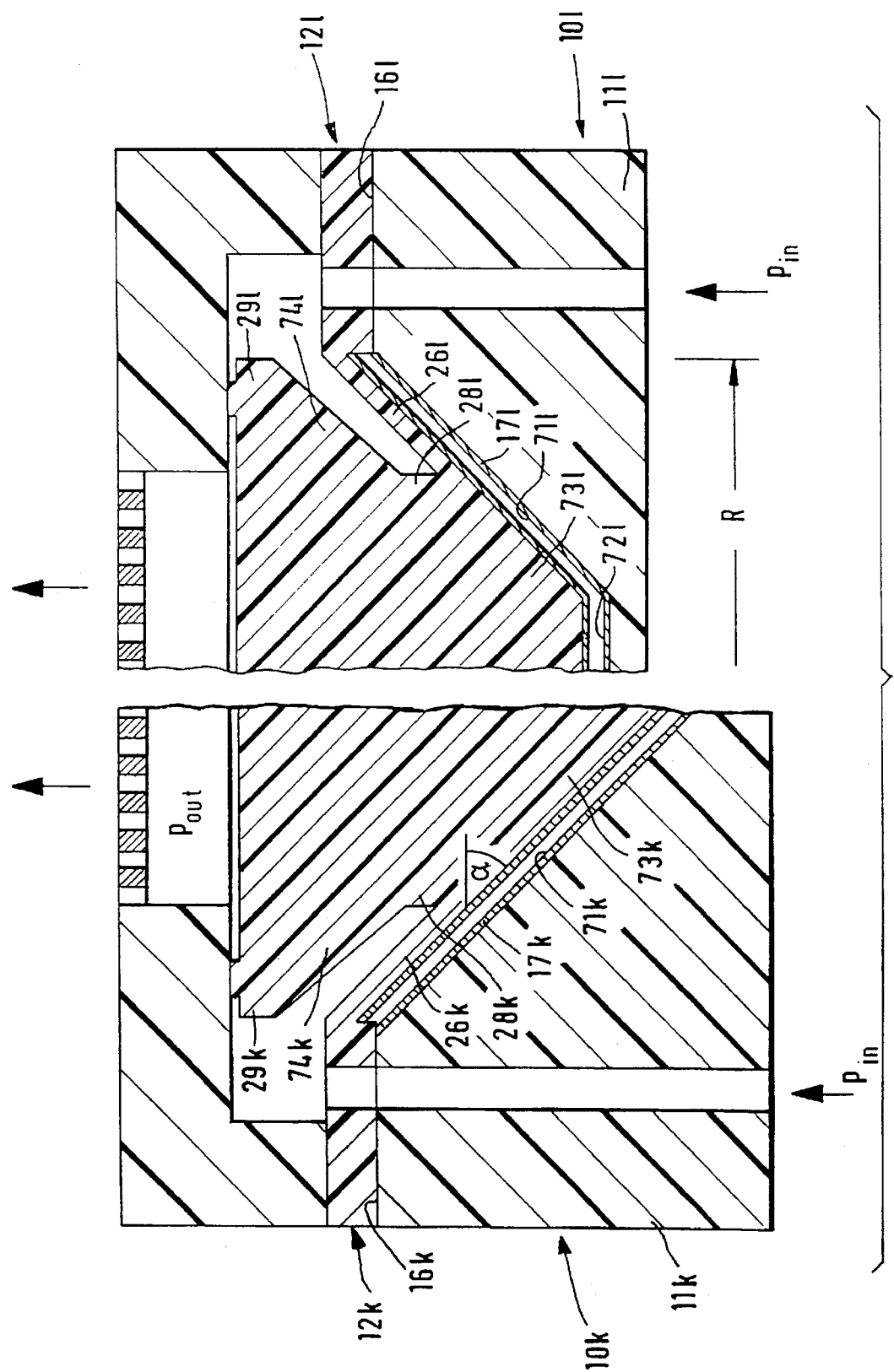

The modifications (10h, 10i, 10k, 10l) of the microvalve 10 described in FIGS. 8 and 9 differ from that described in FIG. 1 by alterations in the bottom parts (11h–11l) and the middle parts (12h–12l).

The bottom parts 11h and 11k illustrated in the respective left halves of the picture of FIG. 8 and FIG. 9 respectively have a conical depression 71h, 71k starting from the upper side 16h and 16k, respectively, of said bottom parts. The bottom parts 11i and 11l illustrated in the respective right halves of the picture of FIG. 8 and FIG. 9 respectively have a frustoconical depression 71i and 71l starting from the upper side 16i and 16l, respectively, of said bottom parts. Each of these depressions 71h to 71l can, however, also be designed as an (axisymmetrical) pyramid-shaped or truncated pyramid-shaped depression.

The outer surfaces of the depressions 71h, 71k and the outer surfaces of the depressions 71i, 71l together with the end faces 72i, 72l are provided with an electrically conducting layer 17h or 17l respectively.

The middle parts 12h and 12i illustrated in FIG. 8 have in each case a projection 28h and 28i and a valve plate 29h and 29i which correspond to those of the microvalve 10 in FIG. 1 and are arranged on a base plate 20h or 20i. The latter has, on its underside 21h or 21i, a depression 25h or 25i which is of annular design and whose outside diameter is greater than the opposite outside diameter of the depression 71h or 71i.

The inside diameter corresponds approximately to that of the projection 28h or 28i. By means of the depression, the membrane 26h, 26i is formed—in analogy to the exemplary embodiment according to FIG. 1. Starting from the underside 21h or 21i, there is formed on the underside of the membrane or of the base plate a conical projection 73h or a frustoconical projection 73i which protrudes into the depression 71h or 71i without the respective outer surfaces contacting one another. The cone angles of the depression 71h or 71i and the projection 73h or 73i correspond to one another. If the depressions 71h–71i are of pyramid-shaped or truncated pyramid-shaped design, the projections 73h–73i are adapted correspondingly.

The depressions 25h and 25i, the outer surfaces of the projections 73h and 73i and the underside 74i of the projections 73i are provided with an electrically conducting layer 22h and 22i respectively.

In analogy to the exemplary embodiment according to FIG. 1, an insulating layer (not illustrated in detail here) can be applied to the electrical layer 17h or 17i of the bottom part or to the electrically conducting layer 22h or 22i of the middle part. The two electrically conducting layers 17h or 17i and 22h or 22e act—as already described above—as electrodes of an electrostatic drive. The surface of the two electrodes is enlarged by the shaping thereof. With the same radius and the same stroke of the electrodes relative to those of the exemplary embodiment according to FIG. 1, the electrostatic driving force is considerably greater than that of an electrostatic drive with flat electrodes. If, in contrast, a driving force of equal size is to be generated, a correspondingly greater working stroke can be implemented. The cone angle or pyramid angle can assume any values between 0° (infinitely flat cone) to 90° (infinitely pointed cone). The size of the cone angle and the height of the truncated cone are dependent on the requirements placed on the microvalve and the possibilities of the production process, and they are restricted by the sensitivity of the closure element (valve plate with projection) to tilting.

The modifications of the exemplary embodiment described in FIG. 9 differ from that described above in FIG. 8 by a changed position of the membrane 25k or 25l. The diameter of the conical or frustoconical depression 71k or 71l corresponds on the upper side 16k or 16l of the bottom part to the outside diameter of the membrane. The membrane 26k or 26l runs together with the outer surface of the projection 73k or 73l parallel to the outer surface of the depression 71k or 71l. The projection 28k or 28i between the base plate 20k or 20i and the valve plate 29k or 29l is adapted to the correspondingly changed dimensions, i.e. a conical transition piece 74k or 74l is fitted between the projection and the valve plate.

In contrast to the four embodiments or modifications of the microvalve described, the electrodes can assume any other geometry which is suitable to enlarge the active surface of the drive (outer surface ≧ base surface) and/or to reduce the distance between the electrodes with the same stroke.

Figure 10:
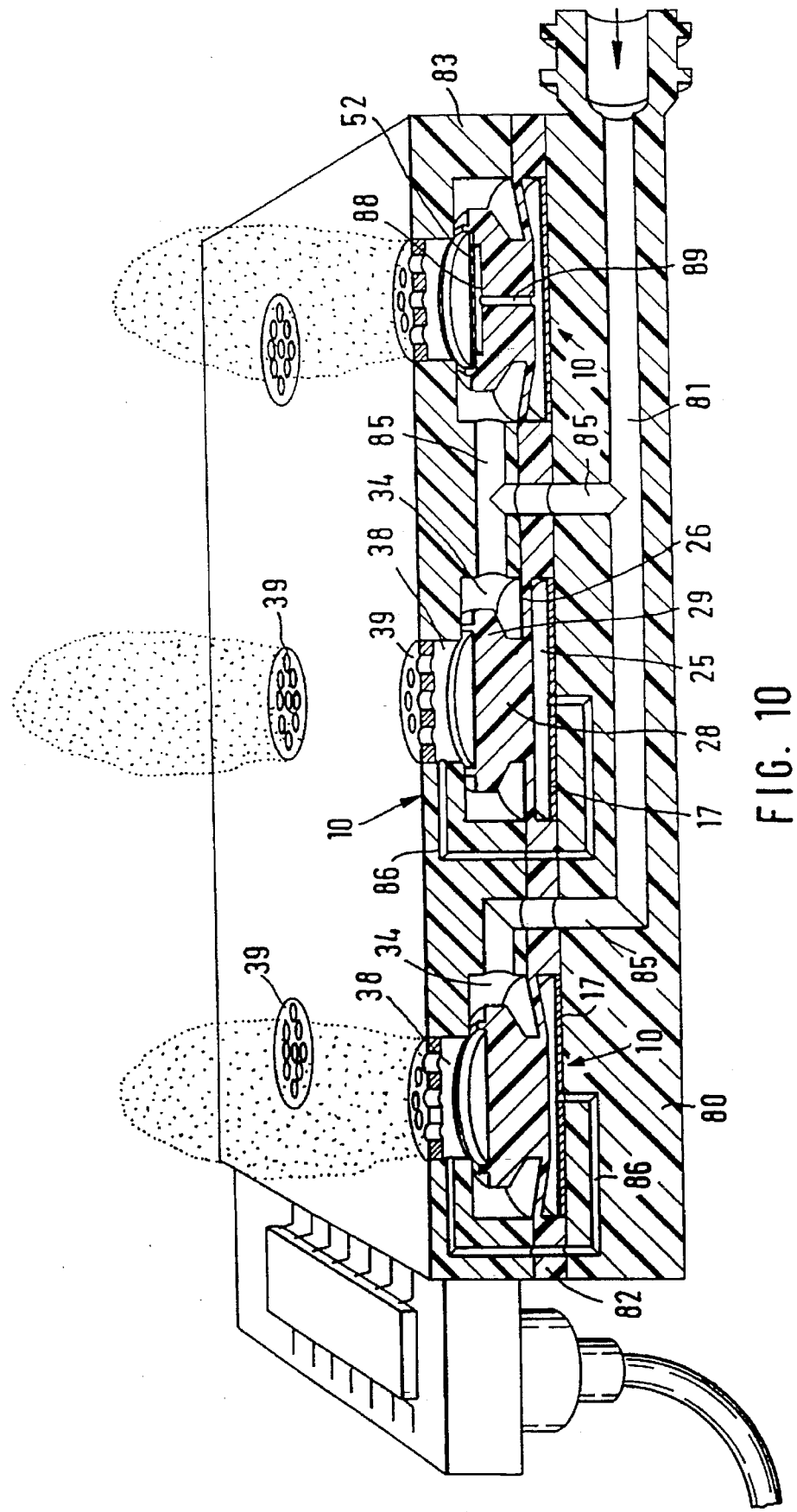

FIG. 10 illustrates a valve arrangement having nine individual microvalves 10 which are connected in parallel and of which three microvalves are illustrated in section. The valve arrangement is of modular construction and has a plate-like bottom part 80 with a collective line 81 via which the pressure medium is supplied. The plate-like bottom part 80 corresponds in its function and its construction essentially to the bottom part 10 of the microvalve according to FIG. 1, in this case nine individual bottom parts being joined together to form a common bottom part, and the individual pressure-medium channels being connected to form a collective channel. Placed on the plate-like bottom part 80 is a likewise plate-like middle part 82 on which, in turn, a plate-like top part 83 is placed. The top part 83 corresponds in its function and its construction to the top part 13 according to FIG. 1, in each case nine top parts being joined together to form a component. The top part 83 correspondingly has 9 nozzle plates 39 which are arranged in three rows each consisting of three nozzle plates or microvalves. Each of these nozzle plates 39 closes off an outlet channel 38 which starts from the interior 34. As already described in FIG. 1, the outlet channel 38 is closed by the valve plate 29 of the microvalve. Each of the nine valve plates 29 with a corresponding projection 28, membrane 26 and depression 25 is formed correspondingly in the middle part 82. Each membrane or each depression 25 is provided, on its underside, with an electrically conducting layer (not illustrated here) without the individual electrically conducting layers contacting one another. Arranged opposite them on the bottom part 80 are nine individual electrically conducting layers which can be actuated individually and independently of one another. The electrically conducting layers 17 and the opposite electrically conducting layers in the depressions 25 in each case form the electrostatic drive of a microvalve.

The action of pressure on each individual microvalve takes place via connection channels 85 which start from the collective pressure line 81 and penetrate the middle part 82 and the top part 83 into the interior 34.

For the pressure compensation, each of the microvalves 10 is assigned an individual compensation channel 86 which connects the outlet channel 38 to the depression 25. The individual microvalves can also be designed in such a way that the compensation channel acts upon the underside of a membrane 52 illustrated in FIG. 4 with the pressure of the outlet channel 38. Alternatively, the compensation channel 86 can additionally run through the valve plate 29 and the projection 28 and connect the cavity 88 below the slack membrane 52b with the depression 25. Pressure fluctuations in the outlet channel 38 are transmitted from the membrane 52b to the cavity 88 and are passed on by the compensation channel 86 to the underside of the drive membrane 26. All the variants of the compensation channel, together with the membrane 52b or even without it, bring about a complete static pressure compensation. When the nozzle plate 39 is used, the pressure in the outlet channel is subjected to fluctuations whose effects can thus be compensated.

As already described, each of the microvalves 10 can be actuated individually and communicates in each case with the collective pressure line 81 independently of the other microvalves. The flow volume through the valve arrangement can thus be switched in stages from zero up to a flow volume which corresponds to the sum of the nine individual flow volumes of the microvalves.

In contrast to the exemplary embodiment described here, different valve elements can also be arranged in the middle part 82, i.e. different designs of the microvalve can be combined in the valve arrangement. For this purpose, different middle parts 12, 12a to 12l can then be combined, for example, to form a common middle part 82 or can be inserted into a corresponding carrier plate. The plate-like bottom part 80 and the top part 83 must be adapted correspondingly. Furthermore, it would also be possible to connect a plurality of microvalves 10, 10a to h together to form a valve arrangement, in that the individual bottom parts 11, 11a to 11l and/or the top parts 13, 13a to 13l are replaced by a corresponding common bottom part 80 or top part 83.

We claim:

1. A microvalve, comprising a plurality of layers arranged one above the other and connected to one another; two pressure medium connections for feeding and discharging a pressure medium; a valve seat arranged between said connections; a closure member cooperating with said valve seat and integrated in one of said layers, said closure member adjoining a space which is acted upon by the pressure medium and having a pressure-compensating surface; and a pressurized membrane arranged so that said pressure compensating surface acts counter to said pressurized membrane, said closure member, said membrane and said pressure compensating surface being formed as a plastic component which is a middle layer, said closure member, said membrane and said pressure compensating surface being formed as an integral plastic component which forms said middle layer.

2. A microvalve as defined in claim 1; and further comprising electric actuating means acting on said closure member for deflecting the latter.

3. A microvalve as defined in claim 2; and further comprising resilient restoring means formed so that said closure member is lifted from said valve seat by actuating said electrical actuating means and is brought to rest against said valve seat again by said resilient restoring means.

4. A microvalve as defined in claim 3, wherein said resilient restoring means is formed as said membrane.

5. A microvalve as defined in claim 2, wherein said electrical actuating means is formed as an electrostatic device having two electrodes, one of said electrodes being formed in a layered manner at least on an underside of said membrane.

6. A microvalve as defined in claim 5, wherein said plurality of layers includes a bottom layer, the other of said electrodes being applied in a layered manner to an upper side of said bottom layer.

7. A microvalve as defined in claim 2, wherein said electrical actuating means is formed as a piezoelectric coating provided on an underside of said membrane.

8. A microvalve as defined in claim 1, wherein said middle layer has an underside facing away from said closure member, said membrane being formed by a cutout on said underside.

9. A microvalve as defined in claim 8, wherein said cutout is formed as a flat cylinder.

10. A microvalve as defined in claim 8, wherein said is formed as an integral axis symmetrical depression.

11. A microvalve as defined in claim 1, wherein said closure member and said pressure compensating surface are formed on a valve plate.

12. A microvalve as defined in claim 11, wherein said membrane has a surface subjecting to a pressure and an active surface acting as said pressure-compensating surface, said surfaces being formed on said valve plate so that forces and moments are eliminated due to pressures acting on said membrane and said pressure compensating surface.

13. A microvalve as defined in claim 1, wherein said membrane is formed as an annular membrane.

14. A valve arrangement, comprising at least two microvalves each including a plurality of layers arranged one above the other and connected to one another; two pressure medium connections for feeding and discharging a pressure medium; a valve seat arranged between said connections; a closure member cooperating with said valve seat and integrated in one of said layers, said closure member adjoining a space which is acted upon by the pressure medium and having a pressure-compensating surface; and a pressurized membrane arranged so that said pressure compensating surface acts counter to said pressurized membrane, said closure member, said membrane and said pressure compensating surface being formed as a plastic component which is a middle layer, said plurality of layers each of said microvalves having a bottom layer and a top layer, said bottom layers of said microvalves and said top layers of said microvalves being formed as a common component, said closure member, said membrane and said pressure compensating surface being formed as an integral plastic component which forms said middle layer.

* * * * *